United States Patent Office
3,287,364
Patented Nov. 22, 1966

3,287,364
N-LOWER ALKYL CARBAMATES OF SALICYLOYLMORPHOLIDE
Richard S. P. Hsi, Kalamazoo, Mich., assignor to The Upjohn Company, Kalamazoo, Mich., a corporation of Delaware
No Drawing. Filed Jan. 13, 1964, Ser. No. 337,182
3 Claims. (Cl. 260—247.2)

This invention relates to new and useful chemical compounds and more particularly to new salicyloylmorpholide N-lower-alkyl-carbamates which are useful as anti-inflammatory as well as insecticidal agents.

The novel compounds of the present invention and the process of their production is illustratively represented by the following formulae:

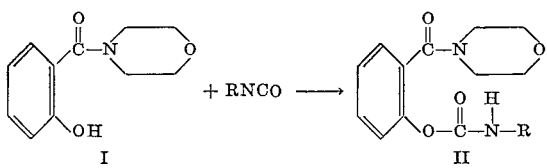

wherein R is a lower-alkyl having from 1 to 6 carbon atoms, inclusive.

Representative for radical R are methyl, ethyl, propyl, isopropyl, butyl, pentyl, hexyl, 2,2-dimethylbutyl, 2,3-dimethylbutyl, isopentyl and the like groups.

The novel compounds of the invention having Formula II have demonstrated anti-inflammatory activity as shown by the granuloma pouch test in rats.

These compounds are therefore useful in the preparation of a wide variety of pharmaceutical compositions, particularly in unit dosage form, each unit containing a predetermined amount of the therapeutic compound of the present invention for oral, topical and parenteral administration. For oral administration compositions can be used in the form of tablets, pills, capsules, boluses, feed granules, elixirs, syrups and the like. For topical administration the compounds of Formula II can be used in the form of ointments, creams, lotions, sprays, solutions, suspensions or powders, while for parenteral administration sterile solutions and suspensions can be prepared in vehicles containing water, ethanol, glycerol, polyalkylene glycols, vegetable oils, and the like.

The compositions, in the appropriate form, can be administered orally and parenterally for systemic treatment, applied topically for local treatment, or administered parenterally for local treatment, such as injection into the joint cavity, tendon sheath and bursa.

The compositions provide the veterinarian with a method for treating inflammations in large and small mammals, birds and fish. The mammals, birds and fish thus treated can be animals raised commercially for profit as well as animals kept for pets or research. Inflammatory conditions which can be treated include, but are not limited to, enteritis, rheumatoid and traumatic arthritis, osteoarthritis, tenosynovitis, bursitis and the like. Also, dermatitis of various origins can be treated.

The compounds also have insecticidal properties. For application as insecticides the compounds of Formula II are formulated into compositions adapted to insecticidal use.

The compounds have further been shown to possess antiviral (e.g., against Newcastle disease virus), cytotoxic, antibacterial (e.g., against *Mycobacterium phlei* and *Salmonella gallinarum*), and sedative activities and can be used in suitable formulations against viral and bacterial infections and as sedatives.

The starting material, salicyloylmorpholide, is a compound known in the art [Gilbert et al., Bull. Soc. Chim. France (1962), p. 1180–83]; a method for its preparation is disclosed.

In carrying out the process of the present invention, salicyloylmorpholide is reacted in an inert organic solvent with a selected alkyl isocyanate. Inert solvents used in the reaction can be, for example, pyridine, diethyl ether, benzene, diisopropyl ether, dioxane, tetrahydrofuran, toluene or the like. The reactants are preferably mixed in equimolecular ratio or using the alkyl isocyanate in slight excess (10 to 50%) above equimolecular proportion. Larger ratios or smaller ratios of starting materials and alkyl isocyanate are operative, but do not provide any advantages. The reaction proceeds at temperatures between about 15 and about 100° C. and can be accelerated by adding a small amount of a base such as triethylamine or using a slightly basic solvent such as pyridine. The time of the reaction is between several hours to one week or more. At about 25° C., usually from 12 hours to 4 days is required for the reaction to be completed. The product is recovered by conventional means, such as filtration or concentration of the reaction mixture followed by filtration, and the product is then purified by washing and recrystallization.

PREPARATION

*Salicyloylmorpholide*

A solution of salicyloyl chloride (19 g.) in 20 ml. of dry tetrahydrofuran was added dropwise with stirring and occasional cooling (when necessary) to a solution of 21.8 g. of morpholine in 80 ml. of tetrahydrofuran. The mixture was kept at about 25° C. for a period of three hours and evaporated at reduced pressure to give a residue. The residue was triturated with 300 ml. of water and filtered. The water-insoluble material remaining on the filter was recrystallized from 170 ml. of absolute ethanol to give 18.85 g. of salicyloylmorpholide of melting point 177–179° C.

*Analysis.*—Calcd. for $C_{11}H_{13}NO_3$: C, 63.76; H, 6.32; N, 6.76. Found: C, 64.05; H, 6.29; N, 6.56.

EXAMPLE 1

*Methylcarbamate of salicyloylmorpholide*

A mixture of 10.36 g. (0.05 mole) of salicyloylmorpholide, methyl isocyanate (11 ml. of a 51% solution in toluene containing 0.066 mole of methyl isocyanate) and 50 ml. of dry pyridine was kept at about 25° C. for a period of 4 days. Thereafter 300 ml. of Skellysolve B hexanes were added to the mixture, which caused precipitation of crude methylcarbamate of salicyloylmorpholide. The crude product was recrystallized from a mixture of 80 ml. of benzene and 100 ml. of Skellysolve B hexanes to give 11.50 g. (87.2%) of pure methylcarbamate of salicyloylmorpholide having a melting point of 124–125° C. and the following analysis:

*Analysis.*—Calcd. for $C_{13}H_{16}N_2O_4$: C, 59.08; H, 6.10; N, 10.60. Found: C, 59.32; H, 6.04; N, 10.23.

EXAMPLE 2

Ethylcarbamate of salicyloylmorpholide

In the manner given in Example 1, salicyloylmorpholide, ethyl isocyanate, and pyridine were allowed to react at 35° C. for a period of 48 hours. The mixture was then treated with Skellysolve B hexanes to obtain ethylcarbamate of salicyloylmorpholide.

EXAMPLE 3

Propylcarbamate of salicyloylmorpholide

In the manner given in Example 1, salicyloylmorpholide and propyl isocyanate were reacted in diethyl ether in the presence of triethylamine at reflux overnight (about 18 hours). The mixture was then treated with Skellysolve B hexanes to obtain propylcarbamate of salicyloylmorpholide.

In the manner given in Examples 1–3, other lower-alkylcarbamates of salicyloylmorpholide were prepared by reacting salicyloylmorpholide with a selected lower-alkyl isocyanate. Representative carbamates thus obtained include the isopropylcarbamate, butylcarbamate, isobutylcarbamate, pentylcarbamate, 2,2- and 2,3-dimethylbutylcarbamate, hexylcarbamate, 3-methylpentylcarbamate, and 1-ethylpropylcarbamate of salicyloylmorpholide.

I claim:

1. A lower-alkylcarbamate of salicyloylmorpholide of the formula:

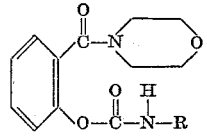

wherein R is lower-alkyl having from 1 to 6 carbon atoms, inclusive.

2. Methylcarbamate of salicyloylmorpholide.
3. Ethylcarbamate of salicyloylmorpholide.

References Cited by the Examiner

Arnold et al.: Chemical Reviews, vol. 57, p. 61, February 1957, No. 1, QD 1 A563.

ALEX MAZEL, *Primary Examiner.*

HENRY R. JILES, *Examiner.*

J. TOVAR, *Assistant Examiner.*